US005799243A

United States Patent [19]
Ojaniemi

[11] Patent Number: 5,799,243
[45] Date of Patent: Aug. 25, 1998

[54] CELLULAR RADIO SYSTEM AND A METHOD FOR MEASURING THE INTERFERENCE LEVEL

[75] Inventor: Heikki Ojaniemi, San Diego, Calif.

[73] Assignee: Nokia Telecommunications Oy, Espoo, Finland

[21] Appl. No.: 774,647

[22] Filed: Dec. 30, 1996

[51] Int. Cl.[6] .................................................. H04B 15/00
[52] U.S. Cl. ........................ 455/63; 455/524; 455/67.1; 455/436
[58] Field of Search ........................... 455/422, 450, 455/452, 453, 63, 67.1, 524, 62, 436, 525, 423

[56] References Cited

U.S. PATENT DOCUMENTS 5,038,399  8/1991  Bruckert ............................ 455/452
5,142,691  8/1992  Freeburg et al. ..................... 455/63
5,175,867  12/1992  Wejke et al.
5,309,503  5/1994  Bruckert et al. .................... 455/452
5,428,815  6/1995  Grube ................................ 455/452

OTHER PUBLICATIONS

Zhao Liu, "SiR-Based Call Admission Control fir DS-CDMA Cellular Systems", 1994 IEEE, pp. 638-644.

*Primary Examiner*—Nguyen Vo
*Attorney, Agent, or Firm*—IP Group of Pillsbury Madison & Sutro LLP

[57] ABSTRACT

For operating a cellular radio system which is subject to interference, the system measures the interference level on at least one radio frequency channel, and reports the measured interference levels, and decisions are made on system level actions using the measured interference levels as an aid in estimating how many new air interface communication links the system is able to tolerate.

12 Claims, 2 Drawing Sheets

1

CELLULAR RADIO SYSTEM AND A METHOD FOR MEASURING THE INTERFERENCE LEVEL

TECHNICAL FIELD OF THE INVENTION

The present invention relates to a cellular radio system comprising at least one base transceiver station BTS, at least one mobile station MS, and an air interface communication link between the BTS and the MS, which air interface communication link is transmitted on at least one radio frequency channel.

DESCRIPTION OF RELATED ART

In the USA, the Federal Communication Commission (FCC) governs the use of the radio frequency (RF) spectrum, deciding which industry is permitted to transmit on certain frequencies. Since the RF spectrum is limited, only a small portion of the spectrum can be assigned to each industry. Therefore, the assigned spectrum must be used efficiently in order to allow as many end-users (customers) as possible to have access to the service offered in the assigned spectrum. Organizations similar to the FCC exist in every country, with similar responsibilities and power.

Multiple access modulation techniques are some of the most efficient techniques for utilizing the RF spectrum. Examples of such modulation techniques include time division multiple access (TDMA), frequency division multiple access (FDMA), and code division multiple access (CDMA), all of which are applied in cellular radio systems.

In FIG. 1, an exemplary cellular radio system has been depicted. In this example, the system has been restricted to three base transceiver stations, BTS 120, 122, 124. Each BTS has of its own a reception area, cell 160, 162, 164. The BTS is a network element maintaining the air interface. It takes care of air interface signaling, ciphering and methods for ensuring an error-free connection between the MS and the BTS. The BTSs are controlled by a base station controller, BSC 110. The BSC controls the radio network. This means, for example, the following: connection establishment, mobility management and collection of statistical material. The BSC has (normally terrestrial) communication links 150 to the BTSs. There are also (in the example depicted, but not as a limitation) three mobile stations, MS 130, 132, 134. The MS is a subscriber terminal, it may be a hand-portable, car-mounted, fixed or similar device for communication. Each MS has an air interface communication link 140, 142, 144 to the BTS.

It is obvious that FIG. 1 is a simplification. In current systems, there exist even thousands of BTSs and even millions of subscribers with their mobile stations. The basic infrastructure of the cellular radio system, excluding the MSs, can be called the network part. Also it has not been depicted that the BSC has connections to the mobile switching center and the network management system. The mobile switching center then has connections to other networks, for example to the world-wide public switched telephone network. As these are not important for the elucidation of the current invention, they will not be further described in detail.

In FIG. 1, also different kinds of interferences experienced in a cellular radio system are depicted. The down-link is the link from the BTS to the MS, the up-link being the link from the MS to the BTS. The down-link interference experienced at BTS 120 consists of the interference caused by the active connections 140 through the BTS itself to the MS 130. Also, the active connections 142, 144 in each neighboring cell 162, 164 cause down-link interference. There also exists other environmental noise 170 that causes down-link interference. This noise may originate from the system itself or it may come from outside the system (=out-of-system interference).

In the up-link direction, there exist similar interferences. These are caused by active connections 140 through the BTS itself, by active connections 142, 144 in the neighboring cells 162, 164, and by other environmental noise 170.

The cellular radio system has a given capacity that presents certain restrictions on how many simultaneous connections the system can handle. These restrictions come from infrastructure hardware capacity, frequency band, theoretical capacity that the technology and/or access method can support, practical capacity having certain limits, within which limits the system remains functional.

The operator of the communication system has acquired a license for a (certain number of) frequency band(s) and the operator is allowed to use that RF spectrum for operating the system. In this band, one or more RF channels exist. As it is known how much of this frequency band one RF channel of the communication system is utilizing, one can easily calculate how many of those RF channels the system can put through. Different multiple access modulation techniques (e.g. FDMA, TDMA, CDMA) consume this resource (frequency band) in a different way, for the RF channels employed by these techniques are different in width.

With the width of the frequency band and the number of RF channels in mind, and making estimations and calculations about the number of customers/connections that need to be handled in each geographical area, the operator has estimated the required number of BTSs and other infrastructure equipment (BSCs, mobile switching centers, etc.) in each area, to support the desired number of customers. The communication system is initially built and later expanded according to these plans made on the hardware requirements.

So, there is the frequency band, there is the number of connections the infrastructure can handle, and there is the multiple access modulation technique chosen. With some multiple access modulation techniques (EDMA, TDMA), the number of simultaneous connections can be directly derived from the number of radio frequencies the infrastructure is capable of supporting with the amount of hardware it contains within the limits of the licensed frequency band. In short, a FDMA system has as many connections as it has radio frequencies in a certain area. A TDMA system has a certain number of connections (time slots) per radio frequency, thus the eventual number of connections in any area is the number of connections per radio frequency times the number of radio frequencies in that area. With these two technologies (FDMA & TDMA), the theoretical and practical capacities of the technology are roughly identical. With CDMA the case is slightly different. The present invention, relates to solving a problem that the CDMA presents to the practical capacity.

CDMA modulation employs a spread spectrum technique for the transmission of information. A spread spectrum system uses a modulation technique that spreads the transmitted signal over a wide frequency band. This frequency band is typically substantially wider than the minimum bandwidth required to transmit the signal. The spread spectrum technique is accomplished by modulating each baseband data signal to be transmitted with a unique wideband spreading code. By using this technique, a signal having a bandwidth of only a few kilohertz can be spread over a bandwidth of more than one megahertz.

A form of frequency diversity is obtained by spreading the transmitted signal over a wide frequency range. Since only 200–300 kHz of a signal are typically affected by a frequency-selective fade, the remaining spectrum of the transmitted signal is unaffected. A receiver that receives the spread spectrum signal, therefore, will be affected less by the fade condition.

In a CDMA-type digital radiotelephone system, multiple signals are transmitted simultaneously over the same frequency. A particular receiver then recognizes the spreading code in the signal. The signals at that frequency, without the particular spreading code intended for a particular receiver, appear as noise to that receiver and are ignored. As the number of connections increases, also the noise level (interference) that each connection experiences (because of other connections) increases.

The number of codes used in CDMA to differentiate various traffic channels in one radio frequency is the theoretical limit of that technology for the number of simultaneous connections one RF channel can support. But, typically, since the interference level increases as the number of connections in the system increases, the theoretical maximum of the technology can never be utilized. The reason for this is that as the number of connections increases, the interference that one connection (any connection) is experiencing eventually becomes so high that the channel of the connection cannot be distinguished with the spreading code any more. And, since all the connections are on the same frequency, every connection will experience the same drastic problem —bad or even lost connection—at the same time. The system has reached the limits of its practical spectral capacity, which in the CDMA system should never happen, because the whole system may collapse.

There are numerous accounts of and opinions (even measurements) about what is the practical limit of the CDMA technology. Those are by no means settled or unified in the context of this invention, nor do they make any difference for the actual invention. More important is that even though the theoretical maximum can never be reached, everything possible is being done for it to be possible to have as many connections (spreading codes) in use as possible, without letting the system to reach its capacity limits.

It is a major problem that in the CDMA system the practical capacity of the system is not known and it also varies as a function of time, place, temperature, etc. The first, and often only, indication about the fact that the system is reaching its capacity limits and that the overall interference is getting much too high, are high Frame Erasure Rates (FER) experienced by several connections in the system at the same time. In consequence, the system has to take certain action to reduce the interference levels: connections are handed off to other BTSs from the ones interfered with, new connections are blocked, hand-offs to BTSs interfered with are not allowed, overall transmission power is reduced in the system, and there are even forced releases of connections.

Other actions also may be taken. What is critical here is that the actions taken in some cases may come too late. The system may have reached its limits already, and might collapse anyway, in spite of the preventive actions. In a less serious case, only some connections may experience problems: FERs may increase even more, the connection (that was perhaps just activated) may be lost, hand-offs may fail, etc. Even this is not tolerable.

As has been described, in worst cases, a CDMA digital radiotelephone system may be very unstable, if the capacity limits of the system and technology are being approached. Therefore, there clearly exists a need for an apparatus and a method that provides a reliable way to estimate and measure the overall interference in the system, and for a method utilizing the measured interference in estimating how much of the theoretical system resources are practically in use.

SUMMARY OF THE INVENTION

The object of the invention is to overcome the above-mentioned problems.

The present invention provides a cellular radio system comprising at least one base transceiver station BTS, at least one mobile station MS, an air interface communication link between the BTS and the MS, which air interface communication link is transmitted on at least one radio frequency channel, means for measuring the interference level on at least one radio frequency channel, means for reporting the measured interference level, and means for making decisions on system level actions using the measured interference levels as an aid.

The use of the invention provides many advantages. The greatest benefit is that the system becomes more stable. Its operation is planned, and no abrupt cut-offs of the communication links occur due to overloading of the system. This brings benefits both in the planning stage and operation of the system. The system is gradually improved in those places where the upper limits of the system are reached.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS OF THE INVENTION

Figure 1:
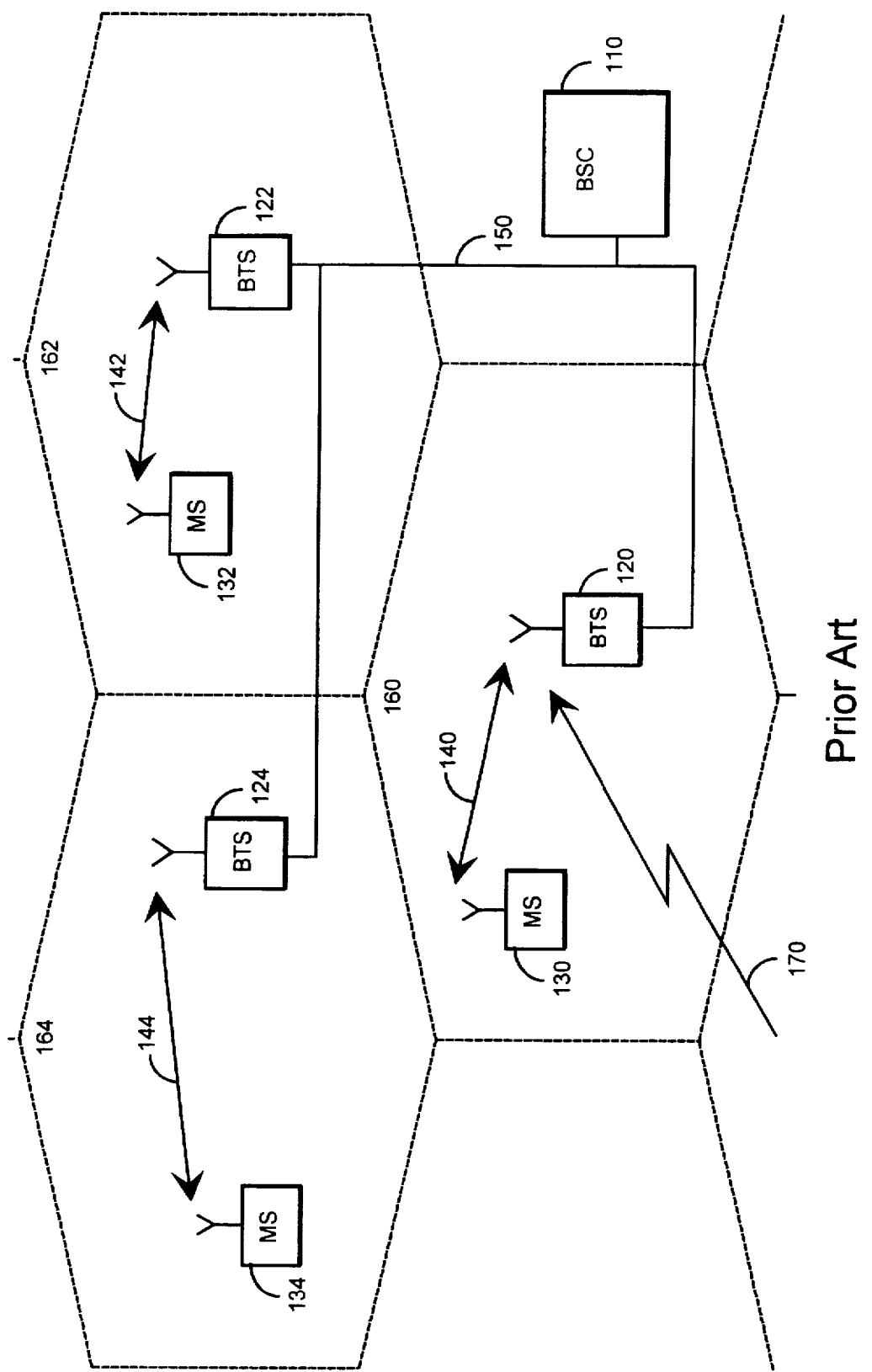
FIG. 1 presents a cellular radio system with its interferences.
Figure 2:
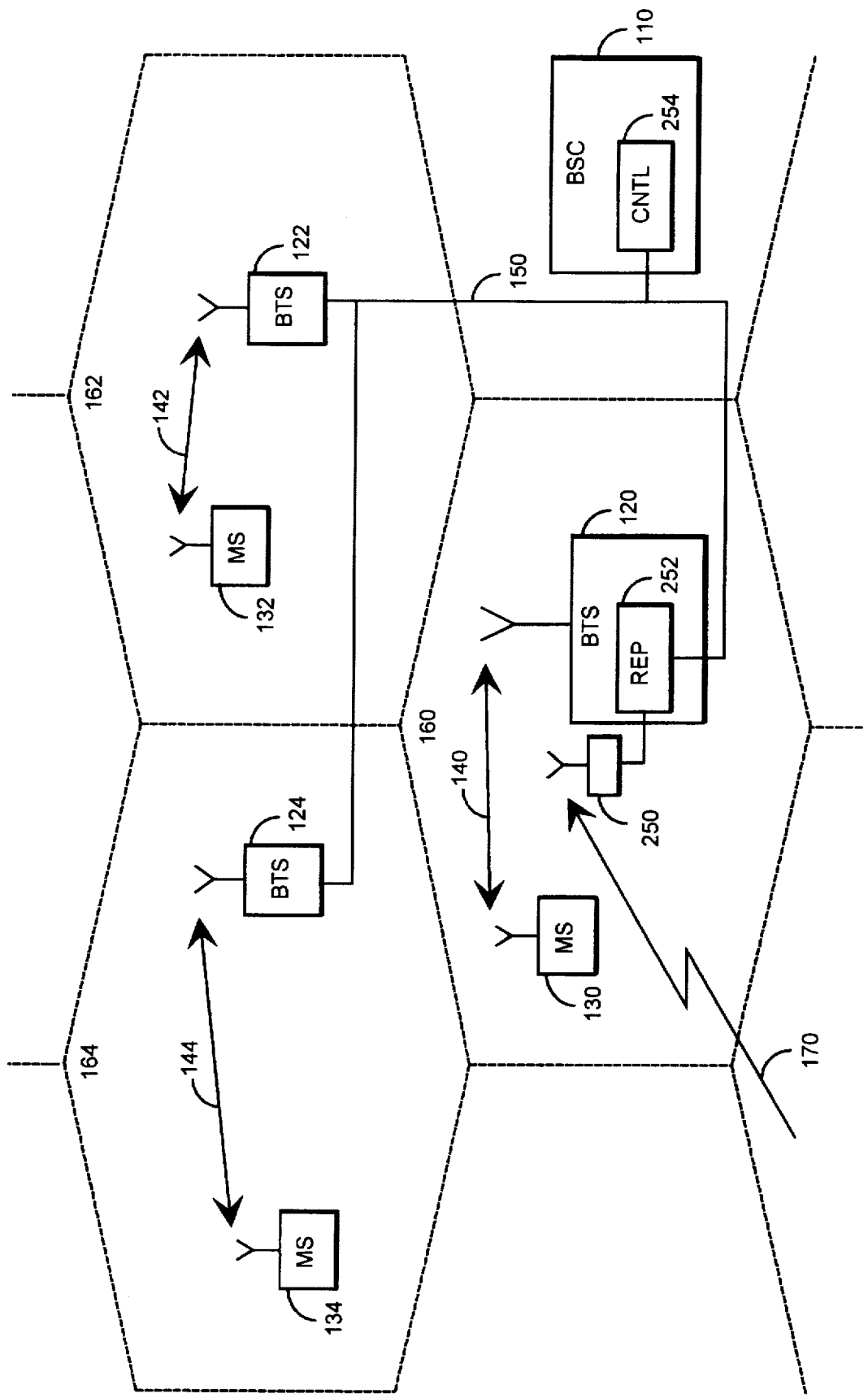
FIG. 2 presents a cellular radio system according to the invention.

FIG. 2 generally depicts a cellular radio system and the sources of interference affecting it. In alternative embodiments, the cellular radio system can be any analog or digital radio system using FDMA, TDMA and/or CDMA as its modulation technique, but a preferred implementation of the cellular radio system is a CDMA digital cellular radiotelephone system.

Referring to FIG. 2, a cellular radio system is shown including at least one base station controller BSC 110, at least one base transceiver station BTS 120, 122, 124 and at least one mobile station MS 130, 132, 134. There exists a communication link 150 between the BSC 110 and the BTS 120, 122, 124. There exists also an air interface communication link 140, 142, 144 between the BTS 120, 122, 124 and the MS 130, 132, 134. This air interface communication link 140, 142, 144 is transmitted on at least one radio frequency channel.

The invention concerns construction and use of the network part of the cellular radio system. Referring to FIG. 2, this is represented by the elements BSC 110 and BTS 120. According to the invention there are means 250 for measuring the interference level in the air interface communication links 140, both in the uplink and downlink directions. This is realized by utilizing the existing measurement receivers in the BTS 120, or else by adding new HW capable of performing the measurement. Every possible radio frequency channel in use can be measured. Furthermore, there are means 252 for reporting the measured interference level. This is preferably realized by using reporting mechanisms known in the art. Reporting is done to some element in the network part, e.g. to the BSC 110. There are also means 254 for making decisions on system-level actions using the measured interference levels as an aid. These system-level actions include hand-offs, power control, new call initiations, call releases and other actions that somehow affect the behavior or circumstances of the system or one or more of its elements. In this way, the system can estimate how much more interference the system is able to tolerate and then make decisions to keep the quality of the offered service at a high level by avoiding high FER in the connections, and even lost connections. Decisions are made in some network element, e.g. in the BSC 110. The best way to realize the above-described means 250, 252, 254 is by software: in such a case, the program directs the functioning of a measurement receiver to achieve the operation of the above-described means 250, another program performs the reporting to achieve the operation/function of the means 252, and yet another program makes the decisions on system level actions to achieve the operation/function of the means 254. Alternative implementation possibilities include integrated circuits, programmable signal processors and other hardware implementations. It is obvious to a person skilled in the art that the above-described means 250, 252, 254 may also be realized otherwise or in some other network element not described here (e.g. in the mobile switching center), this is however totally in accordance with the spirit of the invention.

According to one embodiment of the invention, the network part comprises means 254 for using the measured interference level as an aid for estimating how many new air interface communication links the system is able to tolerate. So, the operation of the system is planned in advance and problems due to capacity over usage are avoided.

Since it is not possible to determine what the source of the interference is, the interference level is measured in three steps:

A) after the BTS 120 has been installed and commissioned and is ready to be taken into use, the out-of system interference is measured, B) when the neighboring BTSs 122, 124 are in use, their effect on the interference level is measured, and C) when the BTS 120 is in use, the overall interference is measured.

The interference level measured in step A) is used as a noise floor, i.e. a reference point relative to which the interference level in normal operation in step C) is reported. This is a good reference point because at that time, there are no active connections in the system itself. The interference value is reported as a dB value relative to the noise floor. The noise floor has an initial default value given to the BTS 120 as a factory setting, or as an initialization parameter that overrules the factory setting.

The interference levels in steps A) and B) are measured as functions of time and/or temperature, or any other parameter. Since the noise floor is measured as a function of time, the BTS 120 can change its noise floor also as a function of time, thus taking into account the fact that at that site the noise floor may be higher in the morning or during the office hours than during the 4 PM–6 PM, rush hours or towards midnight. The function of time can also be enlarged to cover, for example, weekdays or even seasons. Some specific site may experience higher floor noise, for example during the weekend or holiday season. The noise floor as a function of temperature is achieved in such a way that when the noise floor is measured as a function of time, at the same time the measurement results are also stored as a function of temperature at that site.

The BSC 110 stores the noise floor of each BTS 120, 122, 124 over which it has control. Hence, it is easy to use the measured interference levels in the estimation procedures explained above, at the BSC. In the case of multiple noise floors measured as a function of time and/or temperature, the BSC 110 stores them all or the BTS reports the measured interference level with the noise floor value relevant at that time and/or temperature to the BSC 110.

Since conditions do change in a cellular radio system and its environment, the BTS 120 measures the noise floor anew periodically or on a random basis. In this way, the noise floor reflects the real circumstances of the system.

The best way to realize the described enhancements to the basic invention is by software. Alternative implementation possibilities include integrated circuits, programmable signal processors and other hardware implementations. It is obvious to a person skilled in the art that the above-described functionality can also be implemented in some other network element not described here (e.g. in the mobile switching center), this is however totally in accordance with the spirit of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A cellular radio system comprising:

at least one base transceiver station, at least one mobile station, an air interface communication link between said base transceiver station and said mobile station, which air interface communication link is transmitted on at least one radio frequency channel, means for measuring the interference level on said at least one radio frequency channel, means for reporting the measured interference level, means for making decisions on system level actions including at least one of handoffs, power-control, new call initiations and call releases using the measured interference, level as an aid, said means for measuring the interference level being arranged to measure in three steps, namely:

A) after each base transceiver station has been installed and commissioned and is ready to be taken into use, measuring the level of out-of-system interference, B) when base transceiver stations neighboring a respective said base transceiver station are in use, measuring their effect on the interference level, and C) when a respective said base transceiver station is in use, measuring the overall interference level, and said means for measuring being arranged for using the interference level measured in step A) as a noise floor reference point relative to which the interference level in normal operation in step C) is reported.

2. The system according to claim 1, further comprising:

means for using the measured interference level as an aid in estimating how many new air interface communication links the system is able to tolerate.

3. The system according to claim 1, wherein:

said means for measuring is arranged for measuring the interference levels in steps A) and B) as a function of at least one of time and temperature.

4. The system according to claim 1, in which the noise floor is a value given to the base transceiver station as a factory setting or as an initialization parameter that overrules a previously given factory setting.

5. The system according to claim 1, further comprising:

a base station controller controlling said at least one base transceiver station, said base station controller being arranged to store the noise floor reference point of each said base transceiver station over which said base station controller has control.

6. The system according to claim 1, wherein:

each said base transceiver station is arranged to measure, using the respective said means for measuring, the noise floor reference point anew periodically or on a random basis.

7. A method for measuring the interference level in a cellular radio system having at least one base transceiver station, at least one mobile station, and an air interface communication link between the said base transceiver station and said mobile station, which air interface communication link is transmitted on at least one, radio frequency channel, comprising the steps of:

measuring the interference level on at least one said radio frequency channel, reporting the measured interference level, making decisions on system level actions including at east one of handoffs, power-control, new call initiations and call releases using the measured interference level as an aid, wherein the measuring step includes:

A) after each said base transceiver station has been installed and commissioned and is ready to be taken into use, measuring the level of out-of-system interference, B) when base transceiver stations neighboring a respective said base transceiver station are in use, measuring their effect on the interference level, and C) when a respective said base transceiver station is in use, measuring the overall interference level, and using the interference level measured in step A) as a noise floor reference point relative to which the interference level in normal operation in step C) is reported.

8. The method according to claim 7, further comprising the step of:

using the measured interference level as an aid in estimating how many new air interface communication links the system is able to tolerate.

9. The method according to claim 7, wherein:

said measuring includes measuring interference levels in steps A) and B) as a function of at least one of time and temperature.

10. The method according to claim 7, wherein:

the noise floor reference point used is a value given to the respective base transceiver station as a factory setting, or as an initialization parameter that overrules a previously given factory setting.

11. The method according to claim 7, further comprising:

storing by a base station controller which controls said at least one base transceiver station, said noise floor reference point of each said base transceiver station over which said base station controller has control.

12. The method according to claim 7, in which:

in said measuring step, each base transceiver station measures the noise floor reference point anew periodically or on a random basis.

* * * * *